United States Patent [19]

Mackey et al.

[11] 4,323,630

[45] Apr. 6, 1982

[54] TROPHY SUPPORT COLUMN

[76] Inventors: William H. Mackey, 1825 S. Busse Rd., Mount Prospect, Ill. 60058; Lee R. Smith, 200 Mingo Trail, Longwood, Fla. 32750

[21] Appl. No.: 183,190

[22] Filed: Sep. 2, 1980

[51] Int. Cl.[3] .................................... B32B 9/04

[52] U.S. Cl. .................................... 428/542; D11/131; 248/127; 248/158; 312/257 SM; 312/257 SK; 108/150

[58] Field of Search .................... 428/542; D11/131; 108/150; 248/127, 158; 312/257 SM, 257 SK; 52/222

[56] References Cited

U.S. PATENT DOCUMENTS

| | | | |
|---|---|---|---|
| D. 184,857 | 4/1959 | Dodge et al. | D11/131 X |
| D. 187,134 | 2/1960 | Tangney | D11/131 X |
| D. 187,184 | 2/1960 | Tangney | D11/131 X |
| 3,027,670 | 4/1962 | Kramer et al. | 428/542 |
| 3,344,564 | 10/1967 | Siegal | 52/222 X |
| 3,387,415 | 6/1968 | McFarlane | 52/222 |

*Primary Examiner*—Roland E. Martin, Jr.

[57] ABSTRACT

A support column for a trophy or the like comprising two parts, both of which are substantially flat so that they may be readily packed, shipped or inventoried. The column includes a weight-supporting front plate, and a semi-resilient back panel with connecting means therebetween by which the weight-supporting front plate will present a continuous front, while the back panel is disposed in a semi-circular position to form the hollow column.

1 Claim, 5 Drawing Figures

TROPHY SUPPORT COLUMN

SUMMARY OF THE INVENTION

In present day trophy construction, the raised or supporting column is of one piece, or comprises preformed sections adapted to be connected together in such a manner that prevents the appearance of a continuous front wall. These columns require separate packaging for shipping, and large areas for storage and inventory. They are at times difficult to assemble, requiring tools and additional elements, all of which would add undue bulk to the finished product. They are costly to manufacture and do not permit the interchange of parts during assembly.

An object of this invention is to provide a support column for a trophy which comprises two parts. One part is preferably metallic, and is preformed to provide certain recesses and channels; the other part is preferably formed from sheet plastic material which is semi-resilient so that it may be placed in a semi-circular condition and assembled to the weight supporting front panel.

Another object of this invention is to provide a column for a trophy and the like which consists of two parts which may be joined together into a finished column without the use of additional connecting elements and/or tools.

A further object of this invention is to provide two substantially flat parts which may be shipped and stored in their flat condition, and readily assembled into a support column that has the appearance of thickness, strength, and which is pleasing to the eye by reason of presenting a one-piece construction front panel.

DESCRIPTION OF THE DRAWINGS

The invention will be best understood by reference to the accompanying drawings which show the preferred form of construction by which the objectives of the invention are achieved, and in which.

GENERAL DESCRIPTION

Figure 1:
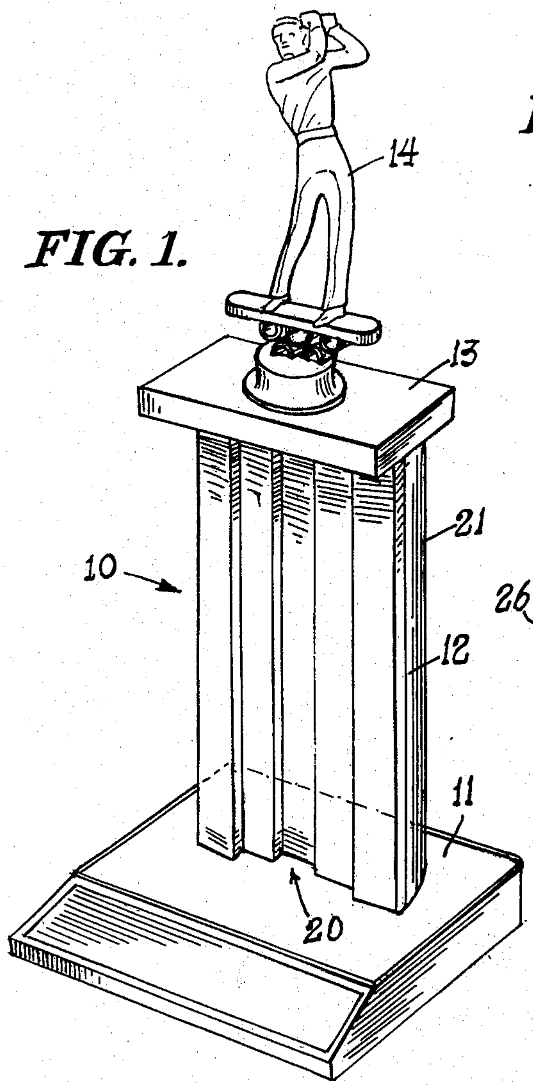
FIG. 1 is a perspective view of a trophy incorporating the support column of this invention.
Figure 4:
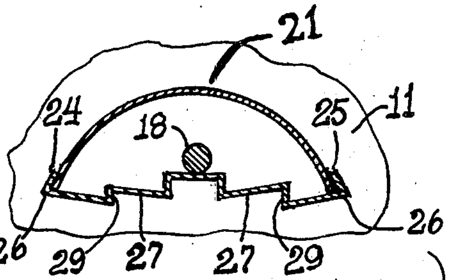
FIG. 4 is a detailed sectional plane view of the support column of this invention.

As illustrated in FIG. 1, there is a trophy 10 including a base 11, a weight-supporting column 12, a support plate 13, and a figure 14.

Figure 2:
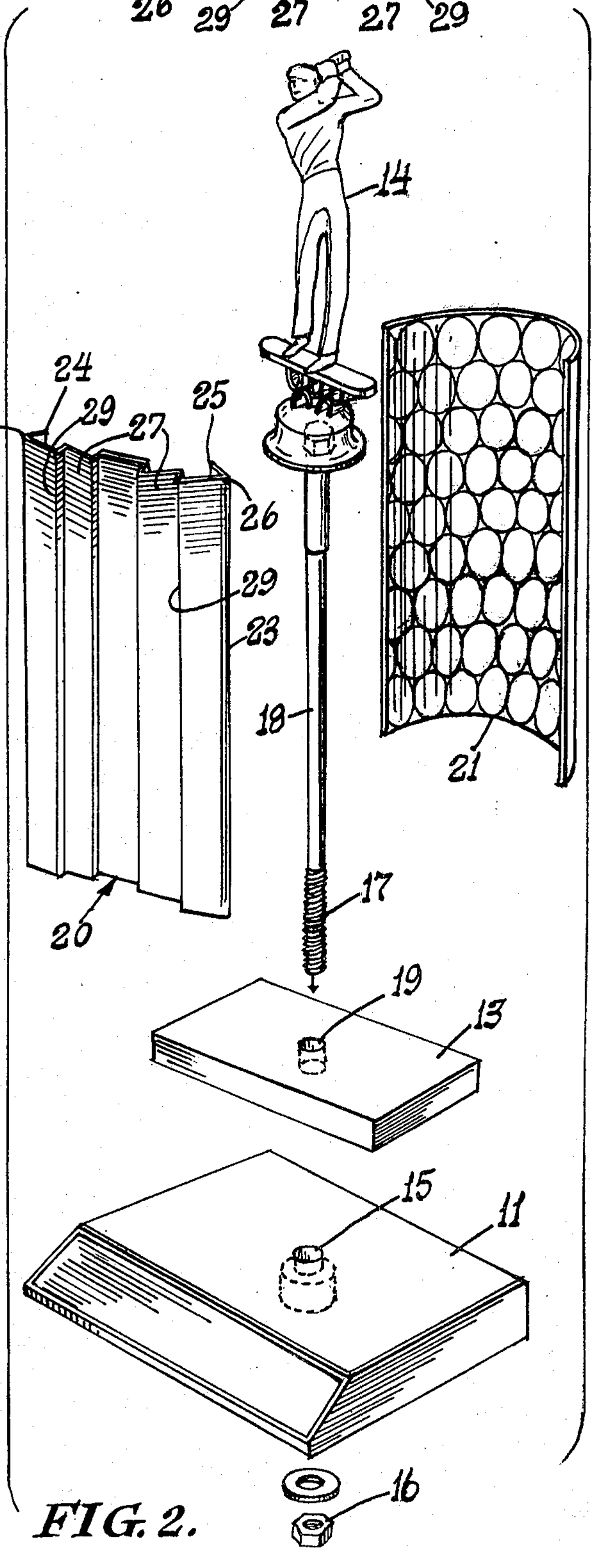
FIG. 2 is a perspective view of the parts of the trophy shown in exploded relationship.
Figure 3:
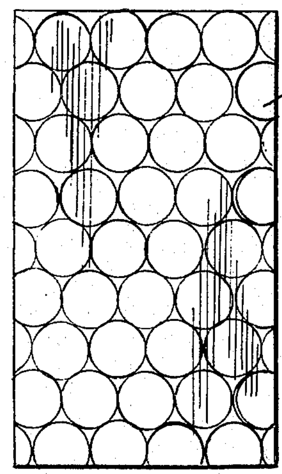
FIG. 3 is a front elevational view of the rear column-forming panel utilized in this invention.

The arrangement of parts is clearly illustrated in FIG. 2 where it is seen that the base 11 provides a countersunk bore 15 which will receive a nut 16 and threaded shank 17 of a connecting rod 18. The rod 18 will extend through the hollow weight-supporting column 12 as well as through an aperture 19 formed in the support plate 13 and threadably receive the figure 14.

The present invention is directed to the weight-supporting column 12 and, as shown in FIG. 2, the column 12 consists of a front plate 20 and a rear column-forming panel 21. The front plate 20 provides along its opposite longitudinal edges 22 and 23 connecting flanges 24 and 25. It should be noted that these flanges are angularly disposed with respect to the front plane of the front plate 20 and provide seats 26 at their junction with their respective edges 22 and 23.

The face of the front plate 20 may be preformed to provide recessed areas 27, having a depth equal to depth of the connecting flanges 24 and 25.

The rear panel 21 constitutes a flat plastic sheet having a length equal to that of the front plate 20 and with a width greater than the width of the front plate 20. This plastic sheet is semi-resilient so that it may be forcibly bent into a semi-circular condition. When the plastic sheet is bent in a semi-circular condition such that its width will equal that of the front plate 20, its longitudinal edges may be projected behind the connecting flanges 24 and 25. When it is so arranged, the combining of the front plate 20 and the rear panel 21 forms a hollow weight-supporting column through which the connecting rod 18 can freely project as it is used to assemble all of the parts heretofor identified into a composite trophy structure.

Figure 5:
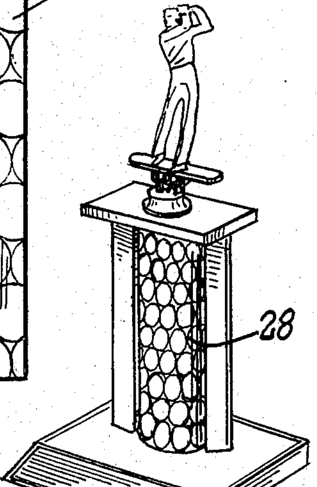
FIG. 5 is a perspective view of a modified support column constructed in accordance with this invention.

As shown in FIG. 5, the column of this invention may have the appearance of the front plate 20 varied by inserting a second semi-circular plastic panel 21 thereover with the longitudinal edges of such panel retained against the shoulders 29 defining the recessed areas 27.

From the foregoing, it is apparent that we have disclosed a weight-supporting column structure which requires but two parts which may be readily assembled without the use of additional tools or connecting members. The two parts are substantially flat and can readily be stored in an unassembled condition. We have also provided a weight-supporting column which, to the eye, discloses a continuous one-piece front, with the front available for additional appearance variations as desired.

When the rear panel 21 has been mounted onto the front plate 20, the top and bottom edges of each element will be paralled so as to have full facial contact with the opposite surfaces of the base 11, and supporting plate 13. As the base and supporting plate are drawn into facial contact with the opposite parallel edges of the front plate and rear panel through the use of the connecting rod 18, they will form an integral structure with the column becoming the weight-supporting member thereof.

To add to the appeal of the trophy column, the plastic rear panel 21 may have one surface hot-rolled with a metallic foil. Both the front plate 20 and rear panel 21 may be embossed with pleasing geometric designs as determined appropriate to add to the eye appeal of the structure.

While we have illustrated and described the preferred form of construction for carrying our invention into effect, this is capable of variation and modification without departing from the spirit of the invention. We therefore do not wish to be limited to the precise details of construction as set forth, but desire to avail ourselves of such variations and modifications as come within the scope of appended claims.

Having thus described our invention, what we claim as new and desire to protect by Letters Patent is:

1. A trophy structure having a base and a support plate with a figure mounted thereon comprising:

(a) a hollow weight supporting column extending in a vertical relation between the base and the figure supporting plate, (b) said column having a rectangularly shaped metallic front plate adapted to be of a length to extend between the base and the supporting plate, (c) a non-metallic back panel having a width greater than that of said front plate and of a length to extend between the base and the supporting plate, (d) flanges extending rearwardly and in converging direction from the opposite side longitudinal edges of said front plate, providing spaced apart retaining members for mounting therebetween said back panel in a rearwardly tensioned bowed condition onto the back of said front panel, (e) said front plate providing in its face a series of spaced apart recessed shoulders for receiving and retaining a decorative front insert panel in a forwardly tensioned bowed condition with respect to the face of said front plate, and (f) a removable decorative front insert panel having a width less than that of said front plate yet greater than the width between said spaced apart shoulders so as to be mounted thereon between longitudinal edges of said front plate.

* * * * *